United States Patent
Zhang et al.

(10) Patent No.: US 10,506,523 B2
(45) Date of Patent: Dec. 10, 2019

(54) SUBBAND SET DEPENDENT UPLINK POWER CONTROL

(71) Applicant: QUALCOMM Incorporated, San Diego, CA (US)

(72) Inventors: Yu Zhang, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 15/699,958

(22) Filed: Sep. 8, 2017

(65) Prior Publication Data
US 2018/0146433 A1 May 24, 2018

Related U.S. Application Data

(60) Provisional application No. 62/423,843, filed on Nov. 18, 2016.

(51) Int. Cl.
*H04W 52/14* (2009.01)
*H04W 52/32* (2009.01)
(Continued)

(52) U.S. Cl.
CPC ......... *H04W 52/146* (2013.01); *H04W 52/06* (2013.01); *H04W 52/08* (2013.01); *H04W 52/10* (2013.01); *H04W 52/243* (2013.01); *H04W 52/325* (2013.01); *H04W 72/0413* (2013.01); *H04W 72/0473* (2013.01); *H04L 5/0048* (2013.01); *H04L 41/0803* (2013.01); *H04W 72/042* (2013.01)

(58) Field of Classification Search
CPC ... H04W 52/146; H04W 52/06; H04W 52/08; H04W 52/10; H04W 52/243; H04W 52/325; H04W 72/0413; H04W 72/0473; H04W 72/042; H04L 5/0048; H04L 41/0803

See application file for complete search history.

(56) References Cited

U.S. PATENT DOCUMENTS 8,982,801 B2 * 3/2015 Shin ...................... H04W 52/08
370/329
9,030,984 B2 * 5/2015 Yang ................... H04W 52/242
370/311
(Continued)

FOREIGN PATENT DOCUMENTS

EP 2945437 A1 11/2015
WO WO-2011040858 A1 4/2011

OTHER PUBLICATIONS

International Search Report and Written Opinion—PCT/US2017/061123—ISA/EPO—dated Jan. 9, 2018.

*Primary Examiner* — Jenee Holland
(74) *Attorney, Agent, or Firm* — Patterson & Sheridan LLP

(57) ABSTRACT

Certain aspects of the present disclosure provide techniques for uplink power control (ULPC) that may help achieve frequency domain interference mitigation. Aspects generally directed to frequency domain interference mitigation. A user equipment (UE) may be configured with multiple subband sets. Each subband set may include one or more bandwidth parts. The UE may apply different ULPC for different subband sets. According to aspects, the UE may combine subband-dependent ULPC with subframe-dependent ULPC.

26 Claims, 11 Drawing Sheets

(51) Int. Cl.
*H04W 52/06* (2009.01)
*H04W 52/10* (2009.01)
*H04W 52/08* (2009.01)
*H04W 52/24* (2009.01)
*H04W 72/04* (2009.01)
*H04L 12/24* (2006.01)
*H04L 5/00* (2006.01)

(56) References Cited

U.S. PATENT DOCUMENTS

| | | | | |
|---|---|---|---|---|
| 9,986,567 | B2* | 5/2018 | Papasakellariou | H04W 52/34 |
| 2003/0026324 | A1* | 2/2003 | Li | H04W 52/08 |
| | | | | 375/141 |
| 2004/0161101 | A1* | 8/2004 | Yiu | H04M 9/082 |
| | | | | 379/406.01 |
| 2008/0019455 | A1* | 1/2008 | Kim | H04L 27/2626 |
| | | | | 375/260 |
| 2009/0303928 | A1* | 12/2009 | Chun | H04L 1/0027 |
| | | | | 370/328 |
| 2010/0027447 | A1* | 2/2010 | Choi | H04L 5/0053 |
| | | | | 370/280 |
| 2010/0220675 | A1* | 9/2010 | Chun | H04B 7/0632 |
| | | | | 370/329 |
| 2010/0246561 | A1* | 9/2010 | Shin | H04W 52/32 |
| | | | | 370/345 |
| 2011/0081939 | A1 | 4/2011 | Damnjanovic et al. | |
| 2011/0141933 | A1* | 6/2011 | Kim | H04W 52/146 |
| | | | | 370/252 |
| 2011/0176581 | A1* | 7/2011 | Thomas | H04B 1/7075 |
| | | | | 375/146 |
| 2012/0008587 | A1* | 1/2012 | Lee, II | H04L 1/0041 |
| | | | | 370/329 |
| 2012/0027111 | A1* | 2/2012 | Vook | H04B 7/0452 |
| | | | | 375/267 |
| 2013/0022142 | A1* | 1/2013 | Nammi | H04B 7/0689 |
| | | | | 375/267 |
| 2013/0114562 | A1 | 5/2013 | Seo et al. | |
| 2013/0132100 | A1* | 5/2013 | Sung | G10L 19/0208 |
| | | | | 704/501 |
| 2013/0148520 | A1* | 6/2013 | Das | H04J 13/0077 |
| | | | | 370/252 |
| 2014/0044069 | A1* | 2/2014 | Bao | H04B 7/0417 |
| | | | | 370/329 |
| 2015/0043448 | A1* | 2/2015 | Chatterjee | H04W 8/005 |
| | | | | 370/329 |
| 2015/0256320 | A1* | 9/2015 | Feng | H04W 52/146 |
| | | | | 370/280 |
| 2019/0037568 | A1* | 1/2019 | Zhang | H04B 7/0626 |
| 2019/0191381 | A1* | 6/2019 | Zhang | H04W 52/14 |

* cited by examiner

SUBBAND SET DEPENDENT UPLINK POWER CONTROL

CROSS-REFERENCE TO RELATED APPLICATIONS

This application claims priority to U.S. Provisional Application Ser. No. 62/423,843, entitled "SUBBAND SET DEPENDENT UPLINK POWER CONTROL," filed on Nov. 18, 2016, which is expressly incorporated herein by reference in its entirety.

INTRODUCTION

Aspects of the present disclosure relate to wireless communications, and more particularly, to subband dependent uplink power control (ULPC).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. 5G is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in 5G technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain wireless communication systems, such as LTE, may use time domain interference mitigation. Time domain interference mitigation may include subframe-based or slot-based uplink power control, wherein the UE may apply a separate uplink power control to different subframe sets or different slots. With the advancements in wireless communication system, the system bandwidth for carriers may increase. Therefore, increased flexibility in interference mitigation may be desirable.

Aspects of the present disclosure provide frequency domain interference mitigation. As will be described in more detail herein, a UE may be configured with multiple subband sets, wherein a subband set may include one or more bandwidth parts. The UE may use different transmit power on each subband set. According to aspects, in certain scenarios, the UE may combine subband and subframe-dependent ULPC.

Certain aspects of the present disclosure provide a method for wireless communications by a BS. The method generally includes configuring a user equipment (UE) to use separate uplink power control (ULPC) processes for at least first and second subband sets and receive uplink transmissions from the UE sent on the first and second subband sets in accordance with the separate ULPC processes and receiving uplink transmissions from the UE sent on the first and second subband sets in accordance with the separate ULPC processes.

Certain aspects of the present disclosure provide an apparatus for wireless communication by a BS. The apparatus includes means for configuring a user equipment (UE) to use separate uplink power control (ULPC) processes for at least first and second subband sets, and means for receiving uplink transmissions from the UE sent on the first and second subband sets in accordance with the separate ULPC processes.

Certain aspects of the present disclosure provide an apparatus for wireless communication that may be performed, for example, by a BS. The apparatus includes at least one processor and a memory coupled to the at least one processor. The at least one processor is configured to configure a user equipment (UE) to use separate uplink power control (ULPC) processes for at least first and second subband sets, and receive uplink transmissions from the UE sent on the first and second subband sets in accordance with the separate ULPC processes.

Certain aspects of the present disclosure provide a computer readable medium for wireless communication by a BS having computer-executable instructions stored thereon for configuring a user equipment (UE) to use separate uplink power control (ULPC) processes for at least first and second subband sets and receive uplink transmissions from the UE sent on the first and second subband sets in accordance with the separate ULPC processes and receiving uplink transmissions from the UE sent on the first and second subband sets in accordance with the separate ULPC processes.

Certain aspects of the present disclosure provide a method for wireless communications by a UE. The method generally includes receiving, from a base station, signaling configuring the UE to use separate uplink power control (ULPC) processes for at least first and second subband sets and sending uplink transmissions on the first and second subband sets in accordance with the separate ULPC processes.

Certain aspects of the present disclosure provide an apparatus for wireless communication by a UE. The apparatus includes means for receiving, from a base station, signaling configuring the UE to use separate uplink power control (ULPC) processes for at least first and second subband sets and means for sending uplink transmissions on the first and second subband sets in accordance with the separate ULPC processes.

Certain aspects of the present disclosure provide an apparatus for wireless communication that may be performed, for example, by a UE. The apparatus includes at least one processor and a memory coupled to the at least one processor. The at least one processor is configured to receive, from a base station, signaling configuring the UE to use separate uplink power control (ULPC) processes for at least first and second subband sets and send uplink transmissions on the first and second subband sets in accordance with the separate ULPC processes.

Certain aspects of the present disclosure provide a computer readable medium for wireless communication by a UE having computer-executable instructions stored thereon for receiving, from a base station, signaling configuring the UE to use separate uplink power control (ULPC) processes for at least first and second subband sets and sending uplink transmissions on the first and second subband sets in accordance with the separate ULPC processes.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
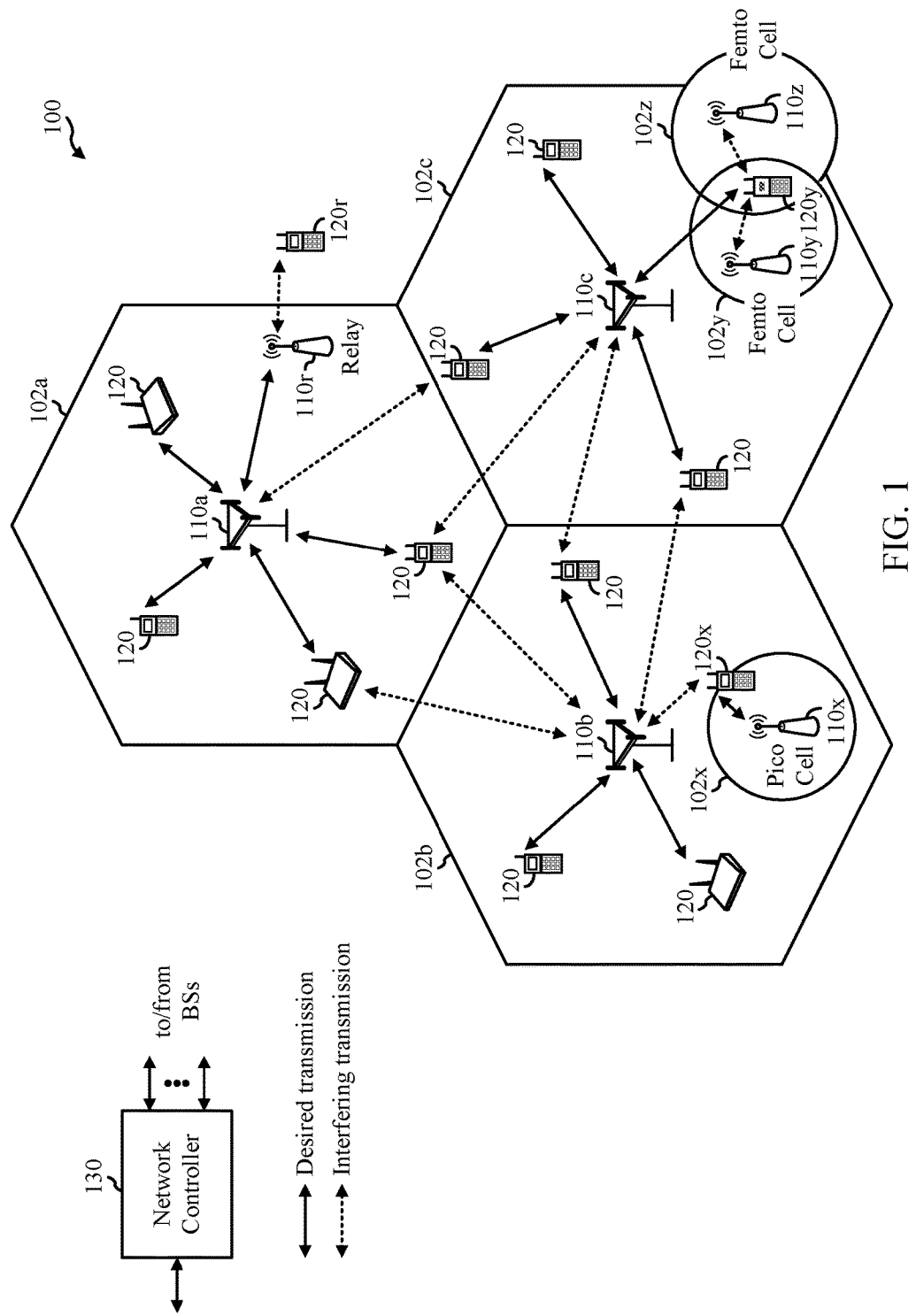
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

5G may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as 5G RA, Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 5G is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later.

Example Wireless Communications System

FIG. 1 illustrates an example wireless network 100 in which aspects of the present disclosure may be performed. For example, the wireless network may be a 5G network. 5G wireless communication systems may employ beams, where a BS and UE communicate via active beams.

As described in more detail herein, certain wireless communication systems, such as LTE, may use time domain interference mitigation, which may include subframe-based or slot-based ULPC. For time domain interference mitigation, a UE may apply a separate uplink power control to different subframe sets or different slots. In 5G, the system bandwidth for a carrier may be much larger than the system bandwidth in LTE. Accordingly, more flexible interference mitigation may be desirable. In accordance with aspects of the present disclosure, a UE may be configured for subband set dependent ULPC. A UE may be configured with multiple subband sets. The UE may use different transmit power on each subband set.

UEs 120 may be configured to perform the operations 800 and methods described herein for subband set dependent ULPC. BS 110 may comprise a transmission reception point (TRP), Node B (NB), 5G NB, access point (AP), new radio (NR) BS, Master BS, primary BS, etc.). The 5G network 100 may include the central unit. The BS 110 may perform the operations 900 and other methods described herein for configuring a UE for subband set dependent ULPC.

As illustrated in FIG. 1, the wireless network 100 may include a number of BSs 110 and other network entities. According to one example, the network entities including the BS and UEs may communicate on high frequencies (e.g., >6 GHz) using beams. One or more BS may also communicate at a lower frequency (e.g., <6 GHz). The one or more BS configured to operate in a high frequency spectrum and the one or more BS configured to operate in a lower frequency spectrum may be co-located.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In 5G systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102*y* and 102*z*, respectively. A BS BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as 5G.

5G may utilize OFDM with a CP on the uplink and downlink and include support for half-duplex operation using TDD. A single component carrier bandwidth of 100 MHz may be supported. 5G resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for 5G may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based. 5G networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

Figure 2:
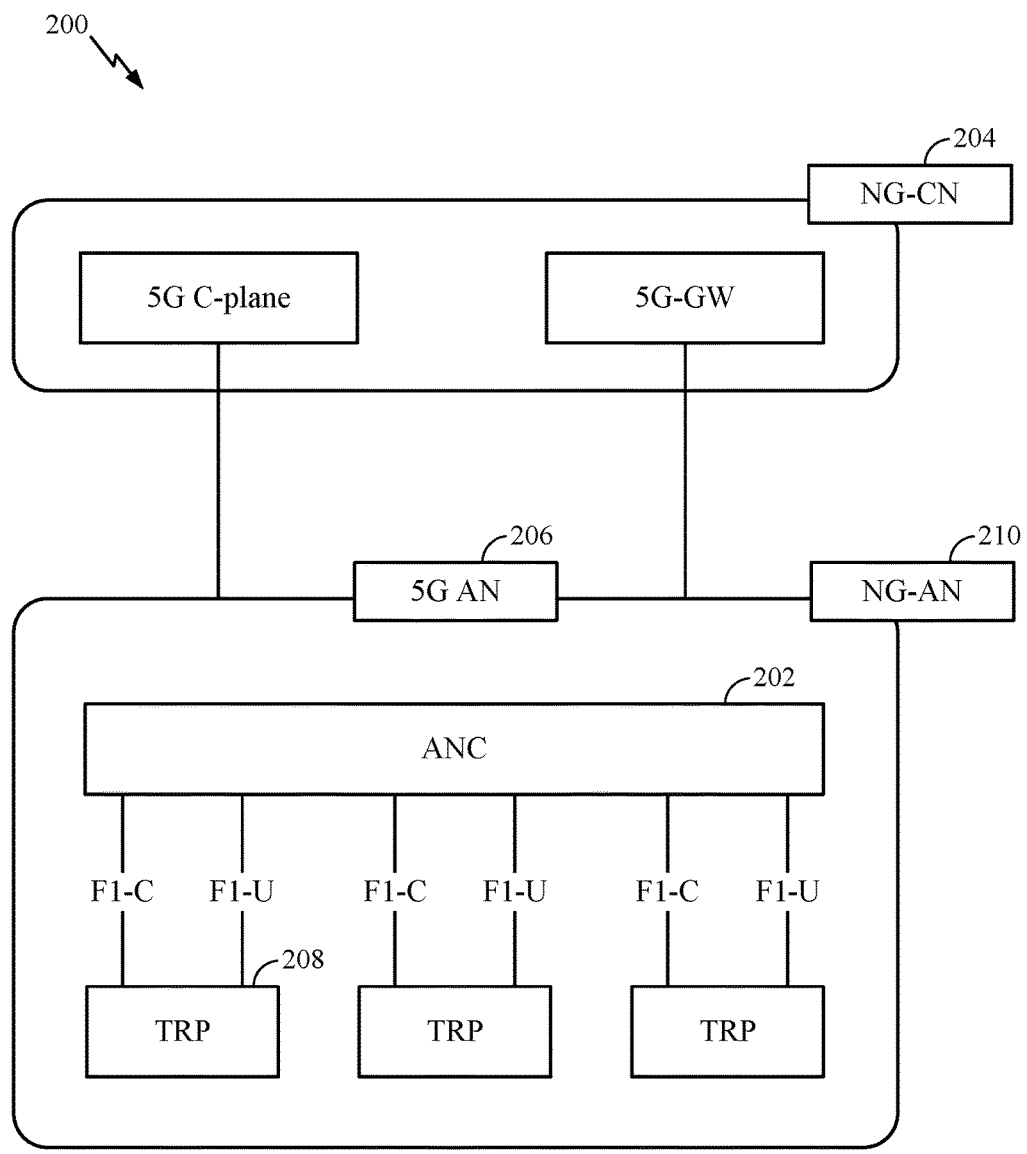
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with 5G. The NG-AN may share a common fronthaul for LTE and 5G.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
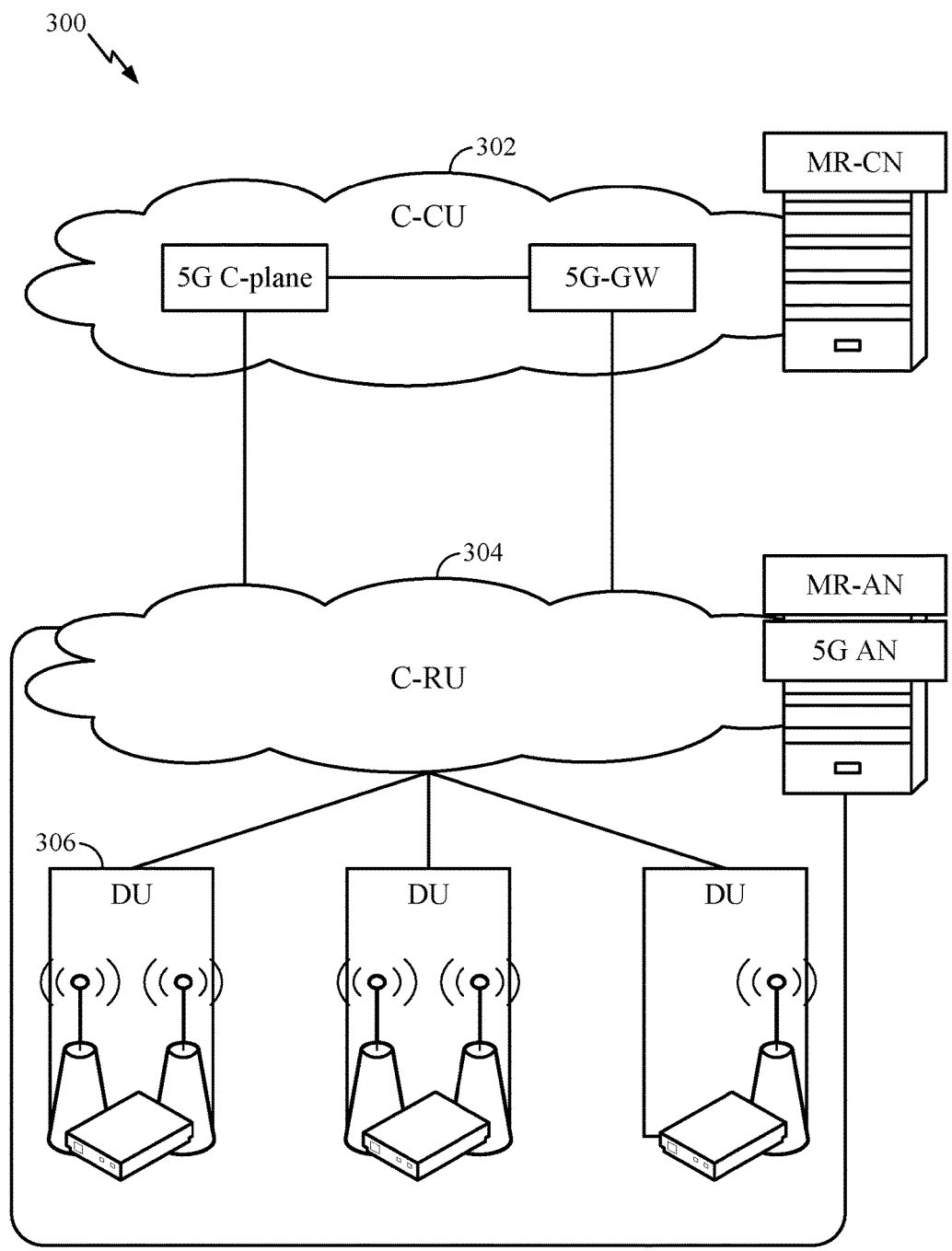
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
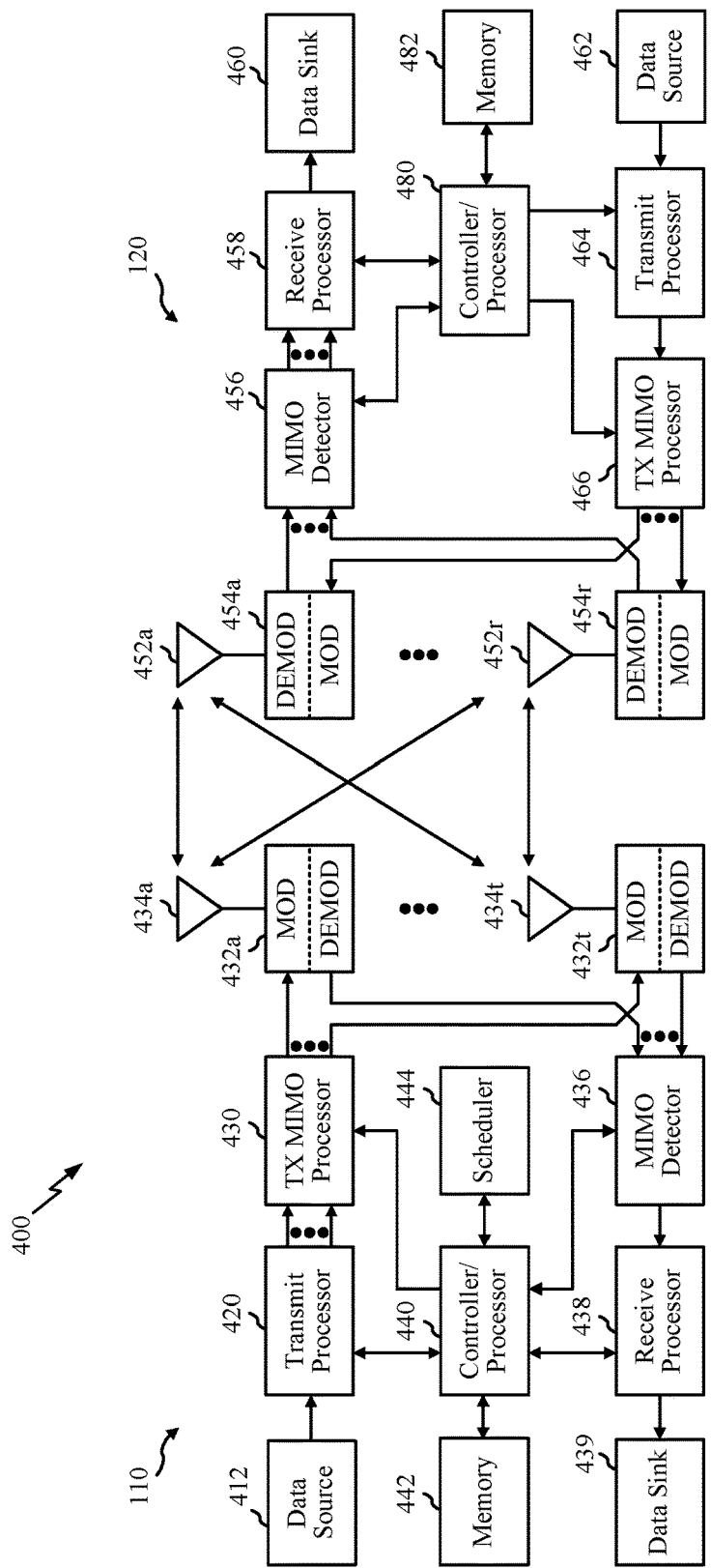
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP or a gNB.

One or more components of the BS 110 and UE 120 may be used to practice aspects of the present disclosure. For example, antennas 452, mod/demod 454, processors 466, 458, 464, and/or controller/processor 480 of the UE 120 and/or antennas 434, mod/demod 432, processors 420, 430, 438, and/or controller/processor 440 of the BS 110 may be used to perform the operations described herein and illustrated with reference to FIGS. 8-9 and the methods described herein.

FIG. 4 shows a block diagram 400 of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct, e.g., the execution of the functional blocks illustrated in FIG. 9, and/or other processes for the techniques described herein. The processor 480 and/or other processors and modules at the UE 120 may perform or direct, e.g., the execution of the functional blocks illustrated in FIG. 8, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
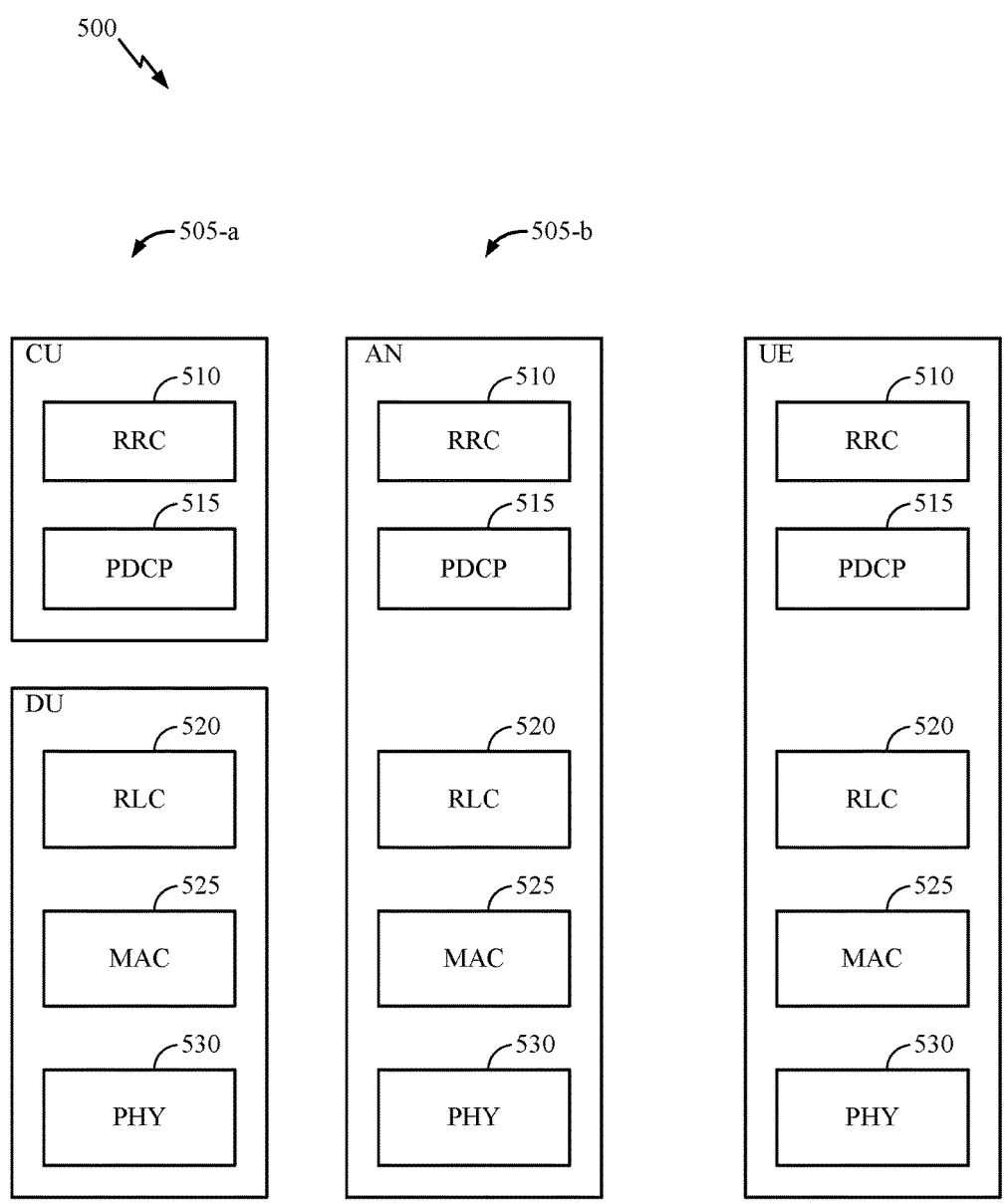
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), 5G base station (5G BS), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
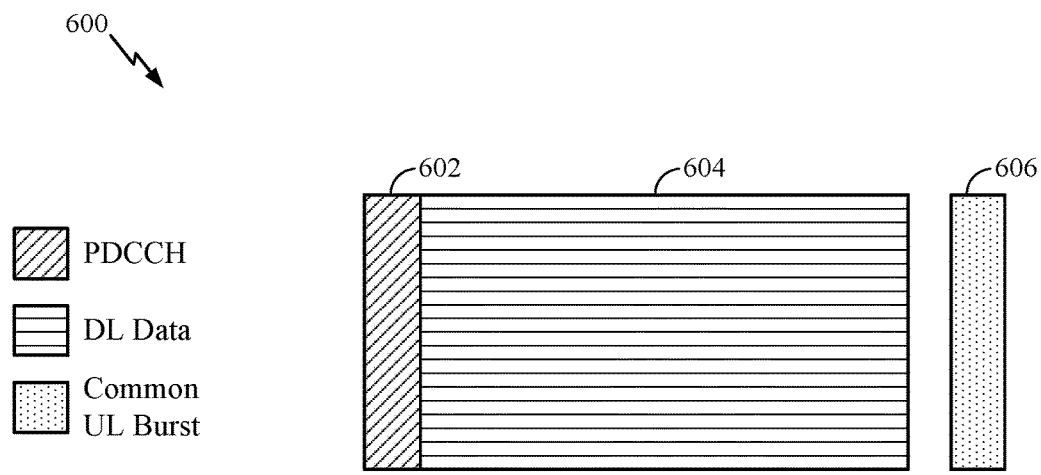
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
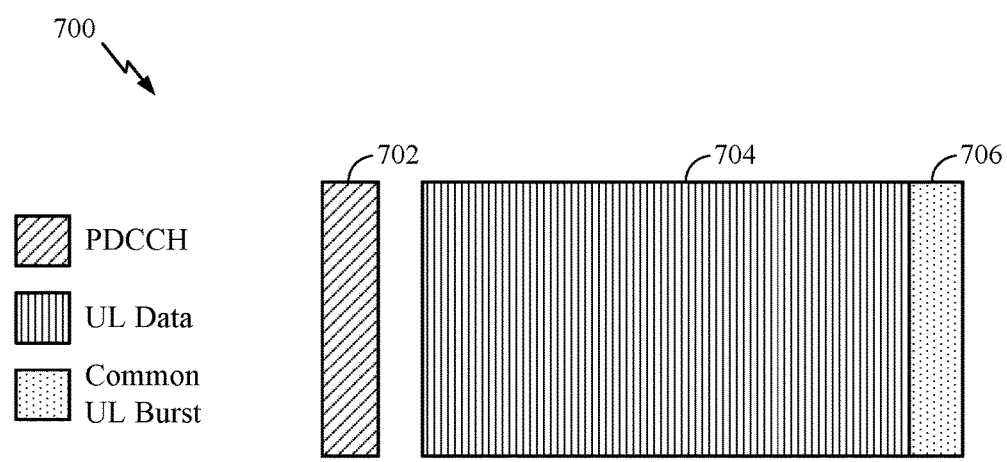
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical UL control channel (PUCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Subband Based Uplink Power Control (UPLC)

In LTE, time domain interference mitigation may be supported. A UE may be configured with two subframe sets and the UE may use a different transmit power in each subframe set.

LTE supports time domain interference mitigation using subframe set dependent uplink power control (ULPC). This generally means that one subframe set may have a different ULPC as compared to another subframe set. Stated otherwise, ULPC may be configured separately for each subframe set associated with a UE. Accordingly, each subframe set may have different ULPC parameters, such as an operating point ($P_O$), a fractional path-loss compensation factor ($\alpha$), and a current maximum power ($P_{CMAX}$).

Subframe set dependent ULPC may be applied to a first and second subframe set. A first subframe set may include UL transmissions having both sounding reference signals (SRS) and PUSCH with semi-persistent scheduling (SPS), but excluding initial PUSCH transmissions. A second subframe set may have different values of $P_O$ configured for PUSCH with and without SPS.

For SRS power control (PC), the parameters of the PUSCH subframe set associated with the normal or special subframes may be used. The UE may use a formula $f_{c,2}(i)$ to compute $P_{SRS,c}(i)$ for a subframe i in the 2nd subframe set, and where c represents the cell.

Transmit power control (TPC) commands are generally accumulated separately for each subframe set. The initialization of $f_{c,2}(i)$ is given by $f_{c,2}(i)=0$ and the value of $f_{c,2}(i)$ is reset (to zero) when the $P_{O\_UE\_PUSCH,c,2}$ value (i.e., the initial power value for the PUSCH for cell c of the $2^{nd}$ subframe set) is changed by higher layers. $f_c(i)$ is typically maintained per subframe set. In other words, $f_c(i)=f_c(i-1)$ (i.e. no change in power) if no TPC command is received in subframe i.

Newer systems, such as 5G, may benefit from additional mechanisms interference mitigation, such as frequency domain interference mitigation. In 5G, the system bandwidth for a carrier can be much larger than that of LTE. For example, while LTE system bandwidth may be up to 20 MHz, for 5G (for sub-6 GHz carrier frequency), system bandwidth can be up to 100 MHz and, for higher carrier frequencies, up to 1 GHz.

Therefore, in 5G, more flexible interference mitigation may be performed in the frequency domain, in addition to the time domain. A UE may be configured with frequency domain measurement restriction for interference measurement, for channel measurements, or both interference measurement and channel measurement. A UE may be configured with multiple subband sets (also referred to as partial-bands, partial-band sets, or bandwidth parts). The UE may use different transmit power on each subband set. Aspects of the present disclosure provide mechanisms that may help enable subband set dependent ULPC, wherein power control is configured separately for each subband set.

Figure 8:
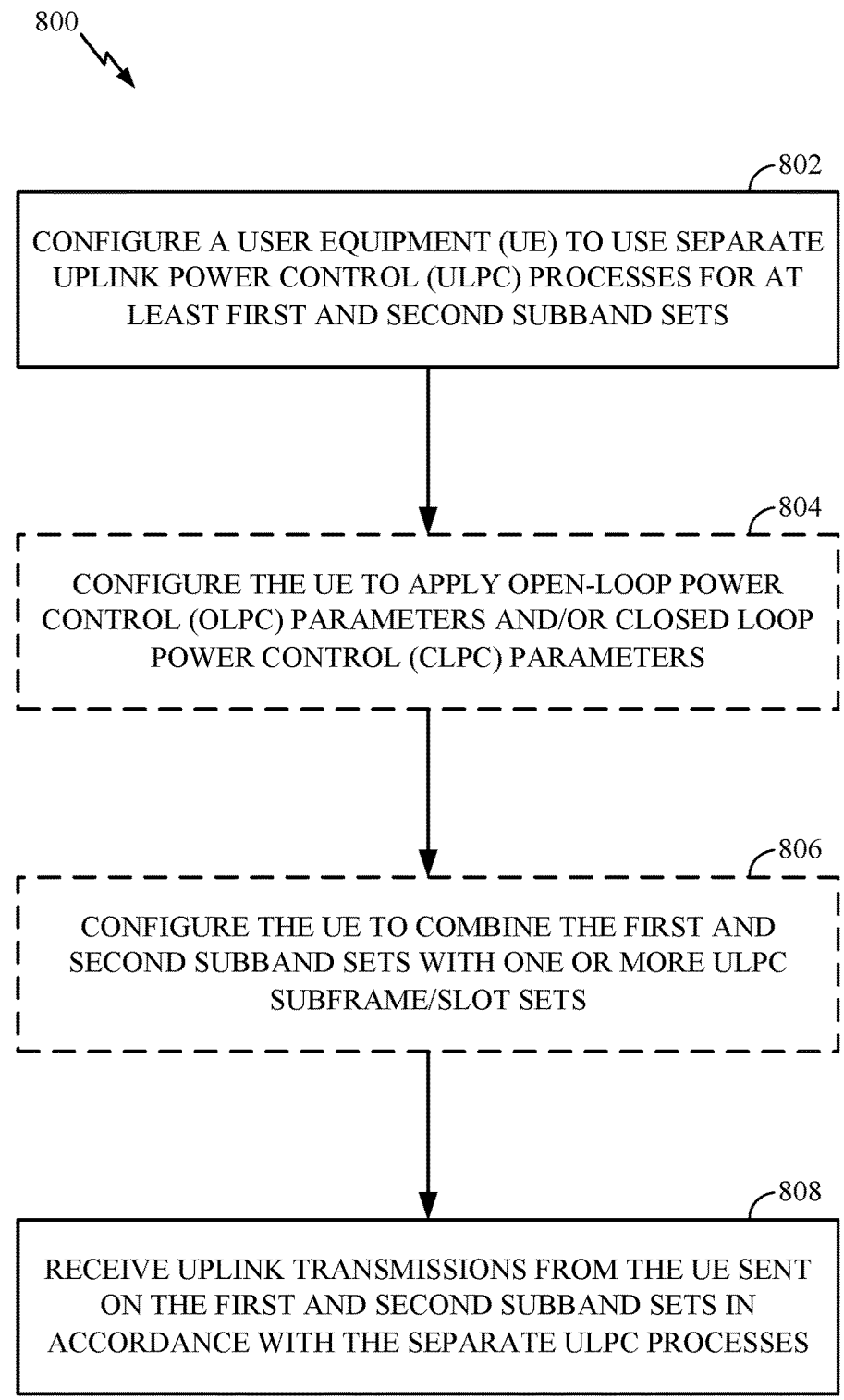
FIG. 8 illustrates example operations performed by a base station, in accordance with certain aspects of the present disclosure.

FIG. 8 illustrates example operations 800, which may be performed by BS, according to aspects of the present disclosure. The BS may include one or more modules of the BS 110 illustrated in FIG. 4. As an example, one or more of the antennas 434, mod/demod 432, processors 420, 430, 438, and/or controller/processor 440 of the BS 110 may be used to perform the operations described herein. Moreover, one or more of the example means illustrated in FIG. 8A may be configured to perform the operations described herein.

At 802, the BS configures a UE to use separate ULPC processes for at least first and second subband sets. As described herein, at least one of the ULPC processes provides power control over multiple subband sets. A subband set may include one or more bandwidth parts. As will be described in more detail herein, ULPC processes may include any combination of open loop power control (OLPC) and closed loop power control (CLPC). OLPC may include outer loop control/outer loop functions and CLPC may include inner loop control/inner loop functions.

Optionally, at 804, the BS configures the UE to apply OLPC parameters and/or CLPC parameters for at least the first and/or second subband sets. In other words, the ULPC process that is applied to a specific subband set may include any combination of OLPC and CLPC. For example, the ULPC process may apply a same OLPC configuration for all subbands in a subband set and may apply different CLPC configurations to subbands in a subband set. According to another example, the ULPC process may apply different OLPC configurations to subbands in a subband set and may apply a same CLPC configuration to all of the subbands in a subband set.

According to another example, the ULPC may apply different OLPC configurations for each subband in a subband set and may apply a same CLPC configuration to all subbands in a subband set. Applying a same CLPC configuration includes using a same closed loop power control command to adjust the transmit power (in addition the OLPC adjustment).

The configurations for OLPC may include parameters for OLPC. The CLPC configuration translates the TCP command to transmit power adjustment used by the UE for UL transmission.

According to one example, a UE may be configured with a first subband set A and a second subband set B. The UE may be configured to apply a same OLPC configuration for each of the subbands in subband set A and subband set B. The UE may be configured to apply different CLPC configurations to the subbands in subband set A as compared to the subbands in subband set B.

According to another example, the UE may be configured to apply a different OLCP configured for each of the subbands in subband set A and subband set B. The UE may be configured to apply a same CLPC configuration to the subbands in subband set A and the subbands in subband set B.

Optionally, at 806, the BS configures the UE to combine the first and second subband sets with one or more ULPC subframe sets or slot sets. Accordingly, the ULPC may be both frequency and time dependent. According to one example, an ULPC process is applied to at least one subframe set or at least one slot set and is also applied to multiple (e.g., at least two) subband sets.

At 808, the BS receives uplink transmissions from the UE sent on the first and second subband sets in accordance with the separate ULPC processes.

Figure 8A:
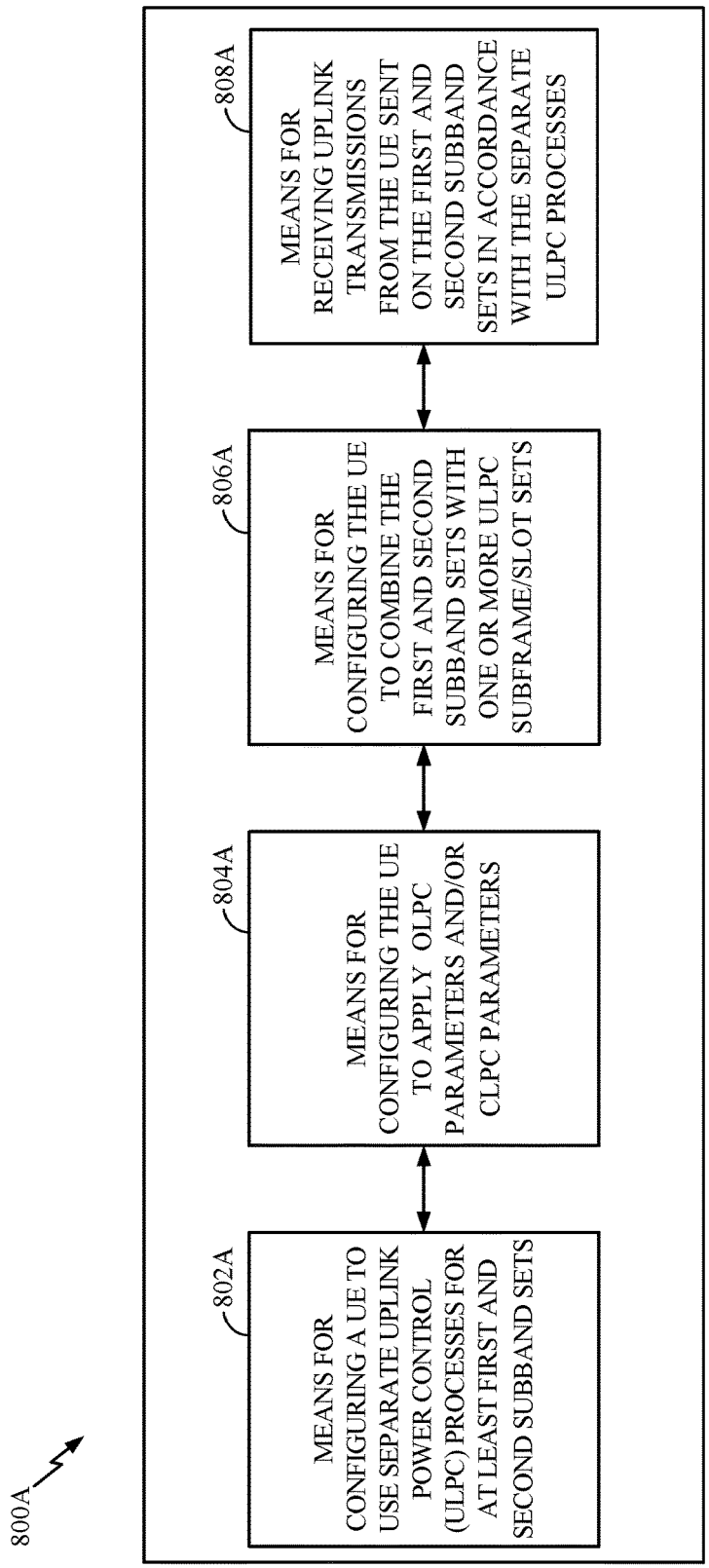
FIG. 8A illustrates example means capable of performing the functions illustrated in FIG. 8.

FIG. 8A illustrates an example BS 800a that include various means capable of performing the functions illustrated in FIG. 8 and described herein. For example, at 802a, the BS may include means for configuring a UE to use separate ULPC processes for at least first and second subband sets. At 804a, the BS may include means for configuring the UE to apply OLPC parameters and/or CLPC parameters to one or more subband sets. At 806a, the BS may include means for configuring the UE to combine the first and second subband sets with one or more ULPC subframe sets or slot sets. At 808a, the BS may include means for receiving uplink transmissions from the UE sent on the first and second subband sets in accordance with the separate ULPC processes. Any one or more of the means illustrate in FIG. 8A may be combined.

Figure 9:
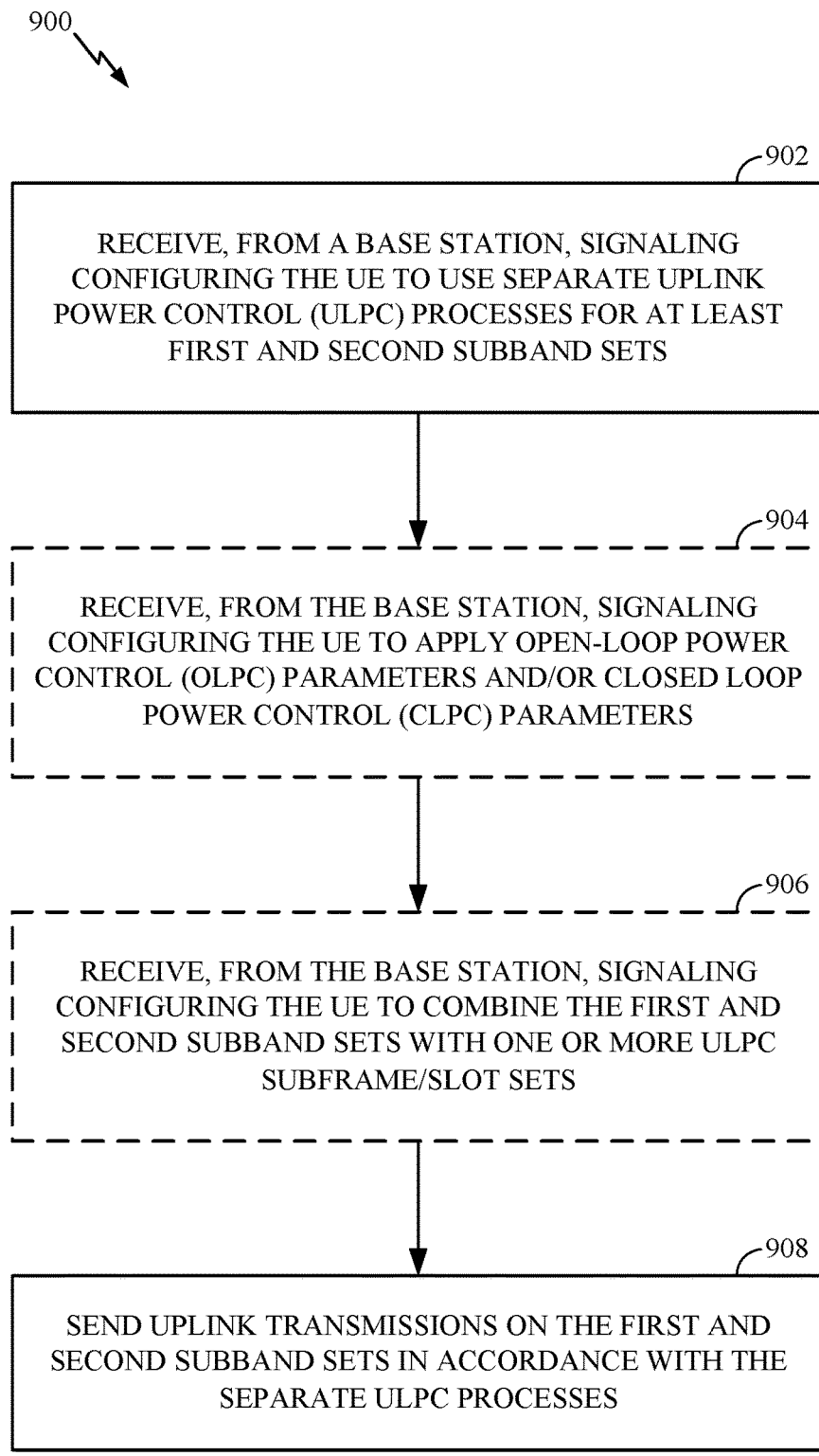
FIG. 9 illustrates example operations performed by a user equipment, in accordance with certain aspects of the present disclosure.

FIG. 9 illustrates example operations 900, which may be performed by a UE, according to aspects of the present disclosure. The UE may include one or more modules of the UE 120 illustrated in FIG. 4. For example, the antennas 452, mod/demod 454, processors 466, 458, 464, and/or controller/processor 480 of the UE may be configured to perform the operations described herein and illustrated with reference to FIG. 9. Moreover, one or more of the example means illustrated in FIG. 9A may be configured to perform the operations described herein. The UE-side operations 900 may be considered complementary to the BS-side operations 800 described above.

At 902, the UE receives, from a BS, signaling configuring the UE to use separate ULPC processes for at least first and second subband sets. According to aspects, at least one ULPC may be applicable to more than one subband set. The ULPC may include a primary ULPC and one or more secondary ULPC processes. The ULPC may include any combination of OLPC and CLPS for each subband set.

Optionally, at 904, the UE receives, from the BS, signaling configuring the UE to apply OLPC parameters and/or CLPC parameters to the first and/or second subband sets. As described above, the UE may be configured to apply a same OLPC configuration for all subbands in a subband set and may apply different CLPC configurations to subbands in a subband set. According to another example, the ULPC process may apply different OLPC configurations to subbands in a subband set and may apply a same CLPC configuration to all of the subbands in a subband set. According to another example, the ULPC may apply different OLPC configurations for each subband in a subband set and may apply a same CLPC configuration to all subbands in a subband set.

Optionally, at 906, the UE receives, from the BS, signaling configuring the UE to combine the first and second subband sets with one or more ULPC subframe sets or slot sets. Accordingly, the UE may be configured to perform subband-dependent and subframe or slot-dependent ULPC. In this manner, ULPC may be performed in both the time domain and frequency domain.

At 908, the UE sends uplink transmissions on the first and second subband sets in accordance with the separate ULPC processes.

Figure 9A:
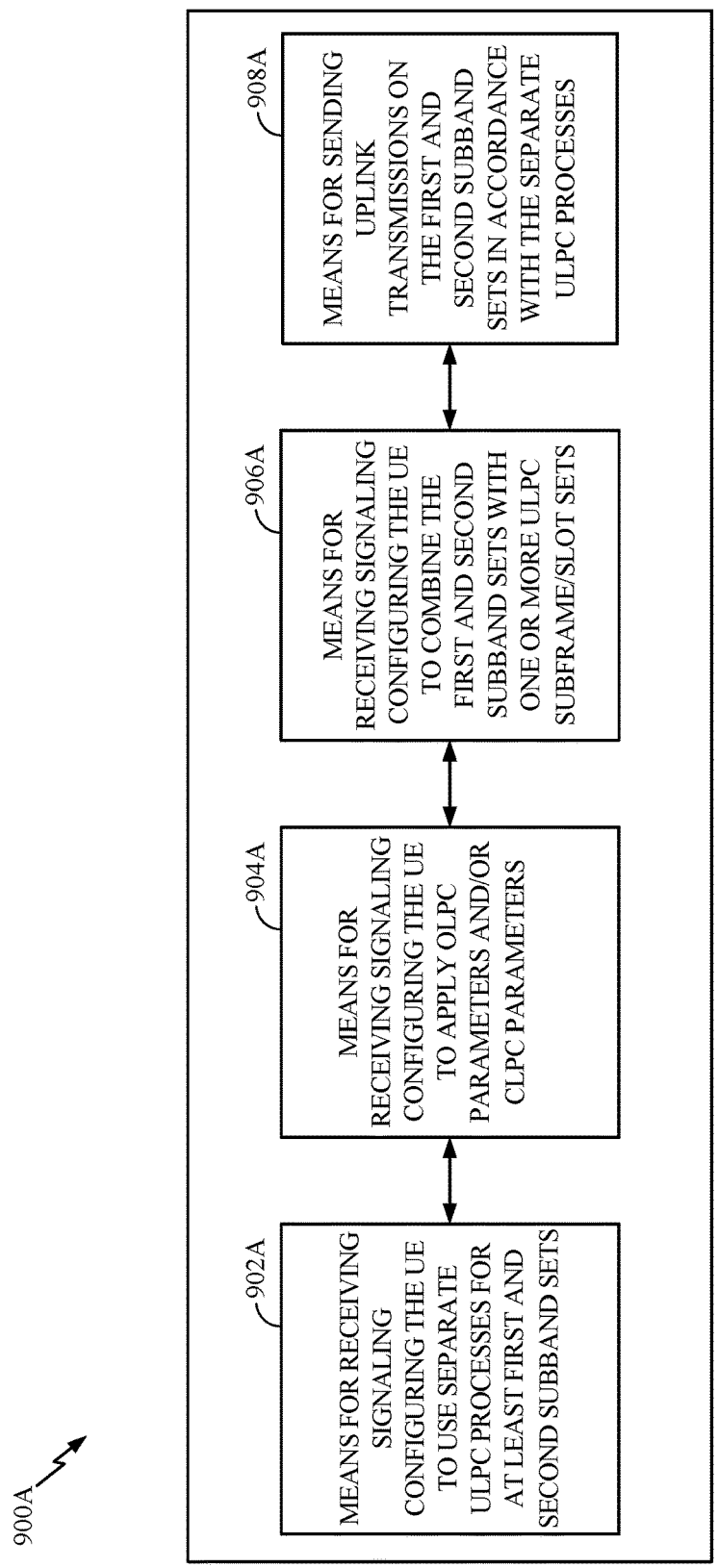
FIG. 9A illustrates example means capable of performing the functions illustrated in FIG. 9.

FIG. 9A illustrates an example UE 900a that include various means capable of performing the functions illustrated in FIG. 9 and described herein. For example, at 902a, the UE may include means for receiving, from a BS, signaling configuring the UE to use separate ULPC processes for at least first and second subband sets. At 904a, the UE may include means for receiving, from the BS, signaling configuring the UE to apply OLPC parameters and/or CLPC parameters to one or more of the first and second subband sets. At 906a, the UE may include means for receiving, from the BS, signaling configuring the UE to combine the first and second subband sets with one or more ULPC subframe sets or slot sets. At 908a, the UE may include means for transmitting uplink transmissions on the first and second subband sets in accordance with the separate ULPC processes. Any one or more of the means illustrate in FIG. 9A may be combined.

Aspects of the present disclosure, thus, provide techniques for ULPC that may help achieve frequency domain interference mitigation. As described herein, with subband-set dependent ULPC, a UE may be configured with two or more subband sets for UL operation.

ULPC may be enabled, such that at least two ULPC processes may be defined for the multiple subband sets. In this manner, (at least some) subband sets have different ULPC processes. In other words, and as illustrated in FIG. 10, at least one ULPC process may be applied to multiple subband sets.

Figure 10:
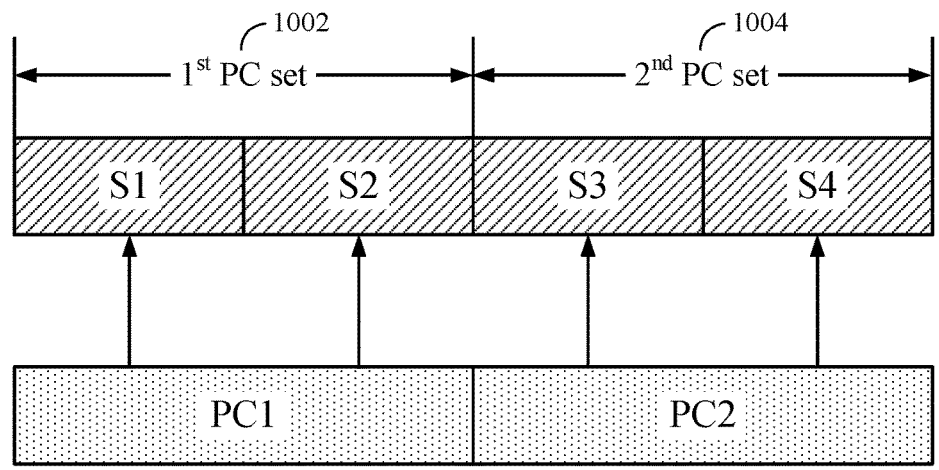
FIG. 10 illustrates an example of subband set based uplink power control, in accordance with certain aspects of the present disclosure.

For example, as illustrated in FIG. 10, a UE may be configured with 4 subband sets (S1, S2, S3, S4) and two ULPC sets (PC1 and PC2). The $1^{st}$ PC set 1002 (PC1) may be applied to subband set S1 and subband set S2 and the second PC set 1004 (PC2) may be applied to subband set S3 and subband set S4.

The set of UL subbands (S1, S2, S3, S4) and/or the set of PC sets (PC1 and PC2) may be classified into a primary one and one or more secondary ones. For example the set of subbands may include a primary PC subband set (S1, S2) and at least one secondary PC subband set (S3, S4).

In some cases, the set of PC subbands can be applied open-loop power control (OLPC) parameters and/or closed-loop power control (CLPC) parameters, as shown in step 804 in FIG. 8 and step 904 in FIG. 9. For example, a same open loop (e.g., outer loop) configuration may be used for all subbands in a PC subband set, but different closed loop (i.e., inner-loop) functions may be used for each of the subbands in the PC subband set. According to another example, a same OLPC configuration and a same CLPC configuration may be applied to all subbands within a subband set. As another example, different open loop values of $P_0$, $\alpha$, and/or $P_{CMAX}$ may be configured for PUSCH with and without SPS.

In some cases, an ULPC subband set can be further combined with one or more ULPC subframe sets or slot sets, as shown in step 806 in FIG. 8 and step 906 in FIG. 9. In the case of a single ULPC subband set, this basically falls back to the subframe/slot set dependent ULPC similar to LTE as described above.

Figure 11:
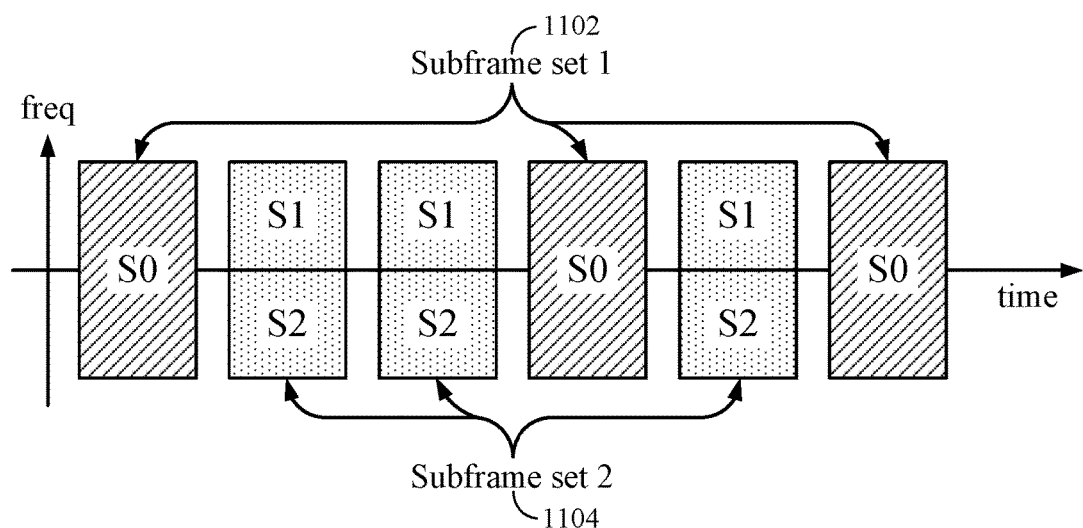
FIG. 11 illustrates an example of subband set and subframe based uplink power control, in accordance with certain aspects of the present disclosure.

FIG. 11 illustrates a configuration of multiple subframe sets and multiple subband sets. In accordance with FIG. 11, a UE is configured with ULPC subframe/slot set 1 1102 and subframe/slot set 2 1104. For subframe/slot set 1 1102, there is only one ULPC subband set (SO). For subframe/slot set 2 1104, there are two ULPC subband sets (S1 and S2). Thus, subframe/slot set 1 1102 falls back to subframe/slot set dependent ULPC (similar to LTE), whereas subframe/slot set 2 1104 incudes subframe/slot-based power control as well as subband-based power control. According to an aspect, an ULPC process may be applied to at least one subframe set and at least two subband set. In FIG. 11, this is illustrated by one ULPC process being applied to subframe set 2 1104, across one or more subband sets. For example, subframe set 2 1104 includes two subband sets S1 and S2. Similarly, according to an aspect, an UPLC process may be applied to at least one time slot across one or more subband sets. According to an example, the ULPC process may be applied to at least one set of subframes and across a plurality of subband sets. Similarly, the ULPC process may be applied to or at least one set of slots and across a plurality of subband sets.

ULPC subband sets can be separately or jointly enabled for different UL channels or for different purposes of the same channel. For example, ULPC subband sets may only be enabled for PUSCH and SRS, but not for PUCCH. As an example, a first set of OLPC parameters may be applied to PUSCH transmissions with SPS, but excluding initial PUSCH transmissions. A second set of OLCP parameters may be applied to PUSCH without SPS. A third set of OLPC parameters may be applied to PUCCH transmissions. A fourth set of OLPC parameters may be applied to SRS transmission. In other words, the UE may use $f_c(i,j)$ to compute $P_{SRS,c}(i,j)$ for the subframe i in the subframe/slot set and the $j^{th}$ subband set for cell c.

According to an example, ULPC subband sets may be enabled for SRS for configuring UL operation, but not for SRS for configuring DL operation (based on channel reciprocity). In certain wireless systems, such as LTE, SRS may be used for UL adaptation. The network may use a received UL SRS to determine an UL modulation and coding scheme (MCS). Assuming channel reciprocity, the network may use the UL SRS to estimate the UL channel. Accordingly, the network may determine a DL precoding matrix based on the UL SRS. In this manner, in LTE, and the SRS may be used for DL link adaptation.

In 5G, however, two types of SRS may be present—one for uplink adaptation and another for downlink adaptation. Thus, an UL SRS may be used to configure DL communication. For SRS used for DL adaptation (e.g., to determine DL precoding information), wideband ULPC may be applied to avoid introducing the impact of ULPC into DL precoding decisions. The UE may introduce special precoding prior to SRS transmission used for DL adaptation. As an example, the UE may embed DL interference information into this SRS. Accordingly, the network may estimate the UL channel from this SRS and may not need to account for DL interference. Therefore, a better DL adaptation may be provided using wideband ULPC (and not using subband based ULPC). Subband set ULPC may be applied to UL SRS which may be used for UL adaptation. However, if SRS is dedicated for DL adaptation, a same power control may be applied to the entire wideband.

ULPC subband set configurations may also determine how a UE handles TPC commands. For example, TPC commands may be accumulated separately for each subband set. The UE uses $f_c(i,j)$ to compute the transmit power for the subframe i and the $j^{th}$ subband set for the serving cell c. The initialization of $f_c(i,j)$ may be given by $f_c(i,j)=0$ and the value of $f_c(i,j)$ may be reset to zero only when $P_{0\_UE\_PUSCH, c}$ is changed by higher layers. $f_c(i,j)$ may be maintained per subband set, such that $f_c(i,j)=f_c(i-1, j)$ if no TPC command is received in subframe i.

According to aspects, TPC commands may be accumulated jointly for all subbands belonging to the same subband set.

The TPC commands for the two or more ULPC subband sets may be separately or jointly coded. For example, in a (unicast or groupcast) downlink control indicator (DCI), two separate TPC commands may be provided for two ULPC subband sets, respectively. Two TPC indices may be configured for a UE for two ULPC subband sets in group power control. For example, a single TPC command may be used for both inner and outer loops (e.g., with a 2-bit value 00 meaning no power change for both sets, while 01 means +1 dB for both sets, 10 means +1 dB for set 1, −1 dB for set 2, and 11 means −1 dB for set 1 and +1dB for set 2).

It may also be possible to determine the applicability of a TPC command for one of the ULPC subband sets based on other factors, such as a timing and/or a location of a downlink control information (DCI). As an example, a UE may receive an UL grant in DL subband1, whose TPC would be used for ULPC subband set 1. But if the same UE receives a UL grant in DL subband2, its TPC may be used for ULPC subband set 2. Similarly, a UE may receive a UL grant in slot 1 with a TPC for subband set 1, while a TPC received in slot 2 may be used for subband set 2.

A UE may also be configured to handle interactions of the two or more ULPC subband sets, for example, in the case that a UL transmission has a frequency that spans two or more ULPC subbands. In such cases, the UE may take various actions.

In some cases, the UE may transmit the UL channel/signal using a reference ULPC subband set. For example, the UE may always use the ULPC subset set with the lowest set index.

In some cases, the UE may transmit the UL channel/signal using each respective ULPC subband set. For example, for a transmission partially falling into the first ULPC subband set, the UE may use the first ULPC for the part of transmission. For a transmission partially falling into the second ULPC subband set, the UE may use the second ULPC for that part of transmission.

In some cases, the UE may treat the occurrence of an UL transmission that has a frequency that spans two or more ULPC subbands such as an error event. For example, the UE may simply omit this transmission. In other words, each UL transmission may be required to be fully contained within a ULPC subband.

As described herein, a UE may be configured for flexible interference mitigation. The UE may be configured to use subband-based ULPC. A UE may use different transmit power on each subband set.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components as shown, for example, in FIGS. 8a and 9a.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer- readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a base station, comprising:
configuring a user equipment (UE) to use separate uplink power control (ULPC) processes for at least first and second subband sets, wherein configuring the UE comprises:
configuring the UE to apply a same open loop power control (OLPC) configuration to all subbands in the first subband set, and apply a different closed loop power control (CLPC) configuration to each subband in the first subband set; or
configuring the UE to apply a different open loop power control (OLPC) configuration to each subband in the first subband set, and apply a same closed loop power control (CLPC) configuration to all subbands in the first subband set; and
receiving uplink transmissions from the UE sent on the first and second subband sets in accordance with the separate ULPC processes.

2. The method of claim 1, wherein:
at least one of the ULPC processes provides power control over multiple subband sets.

3. The method of claim 1, wherein the separate ULPC processes comprise:
a primary ULPC process; and
one or more secondary ULPC processes.

4. The method of claim 1, wherein at least one of the ULPC processes involves closed loop power control (CLPC).

5. The method of claim 1, wherein at least one of the ULPC processes involves open loop power control (OLPC).

6. The method of claim 1, wherein:
a first closed loop power control (CLPC) configuration is applied to all subbands in the first subband set; and
a second CLPC configuration, different than the first CLPC configuration, is applied to all subbands in the second subband set.

7. The method of claim 1, wherein:
a first open loop power control (OLPC) configuration is applied to all subbands in the first subband set; and
a second OLPC configuration, different than the first OLPC configuration, is applied to all subbands in the second subband set.

8. The method of claim 1, wherein the UE is configured with one or more of:
   a first set of open loop power control (OLPC) parameters for physical uplink shared channel (PUSCH) transmissions with semi-persistent scheduling (SPS);
   a second set of OLPC parameters for PUSCH transmissions without SPS;
   a third set of OLPC parameters for PUCCH transmission; and
   a fourth set of OLPC parameters for SRS transmission.

9. The method of claim 1, further comprising:
   configuring the UE with one or more sets of subframes or sets of slots; and
   wherein each ULPC process is applicable to at least one of the sets of subframes or sets of slots.

10. The method of claim 9, wherein:
    at least one of the ULPC processes is applied to:
      at least one of the set of subframes across one or more of the subband sets or
      at least one of the set of slots across one or more of the subband sets.

11. The method of claim 1, wherein ULPC processes are applied to only certain types of uplink transmissions.

12. The method of claim 1, wherein ULPC processes are applied to sounding reference signal (SRS) transmissions for configuring uplink operation, but not for SRS transmissions for configuring downlink operation.

13. The method of claim 1, further comprising:
    transmitting transmit power control (TPC) commands to the UE, each TPC command corresponding to a separate ULPC process.

14. The method of claim 13, wherein TPC commands for different ULPC processes are jointly coded.

15. The method of claim 13, wherein which ULPC process a TPC corresponds to is determined by at least one of: a timing or location of a downlink control information (DCI) resource.

16. A method for wireless communications by a user equipment (UE), comprising:
    receiving, from a base station, signaling configuring the UE to use separate uplink power control (ULPC) processes for at least first and second subband sets, wherein receiving signaling comprises receiving signaling that configures the UE to:
      apply a same open loop power control (OLPC) configuration to all subbands in the first subband set, and apply a different closed loop power control (CLPC) configuration to each subband in the first subband set; or
      apply a different open loop power control (OLPC) configuration to each subband in the first subband set, and apply a same closed loop power control (CLPC) configuration to all subbands in the first subband set; and
    sending uplink transmissions on the first and second subband sets in accordance with the separate ULPC processes.

17. The method of claim 16, wherein:
    at least one of the ULPC processes provides power control to multiple subband sets.

18. The method of claim 16, wherein:
    a first closed loop power control (CLPC) configuration is applied to all subbands in the first subband set; and
    a second CLPC configuration, different than the first CLPC configuration, is applied to all subbands in the second subband set.

19. The method of claim 16, wherein:
    the UE is configured with one or more sets of subframes or sets of slots; and
    each ULPC process is applicable to at least one of the sets of subframes or sets of slots and at least one of the ULPC processes is applied to:
      at least one of the set of subframes across one of more of the subband sets, or
      at least one of the sets of slots across one or more of the subband sets.

20. The method of claim 16, wherein:
    when the UE has an uplink transmission with a frequency span over two or more ULPC subbands, the UE transmits the uplink transmission using a reference ULPC subband set.

21. The method of claim 16, wherein:
    when the UE has an uplink transmission with a frequency span over two or more ULPC subbands, the UE transmits the uplink transmission using the respective ULPC for each subband.

22. The method of claim 16, wherein:
    when the UE has an uplink transmission occurrence with a frequency span over two or more ULPC subbands, the UE treats the occurrence as an error event.

23. The method of claim 16, wherein the UE is configured with:
    a first set of open loop power control (OLPC) parameters for physical uplink shared channel (PUSCH) transmissions with semi-persistent scheduling (SPS); and
    a second set of OLPC parameters for PUSCH transmissions without SPS.

24. The method of claim 16, wherein the UE is configured with:
    a first set of open loop power control (OLPC) parameters for physical uplink shared channel (PUSCH) transmissions with semi-persistent scheduling (SPS);
    a second set of OLPC parameters for PUSCH transmissions without SPS;
    a third set of OLPC parameters for PUCCH transmission; and
    a fourth set of OLPC parameters for SRS transmission.

25. An apparatus for wireless communication by a base station, comprising:
    at least one processor configured to:
      configure a user equipment (UE) to use separate uplink power control (ULPC) processes for at least first and second subband sets, wherein the at least one processor is configured to:
        configure the UE to apply a same open loop power control (OLPC) configuration to all subbands in the first subband set, and apply a different closed loop power control (CLPC) configuration to each subband in the first subband set; or
        configure the UE to apply a different open loop power control (OLPC) configuration to each subband in the first subband set, and apply a same closed loop power control (CLPC) configuration to all subbands in the first subband set; and
      receive uplink transmissions from the UE sent on the first and second subband sets in accordance with the separate ULPC processes; and
    a memory coupled to the at least one processor.

26. An apparatus for wireless communication by a user equipment (UE), comprising:
    at least one processor configured to:
      receive, from a base station, signaling configuring the UE to use separate uplink power control (ULPC)

processes for at least first and second subband sets, wherein the at least one processor is configured to:
apply a same open loop power control (OLPC) configuration to all subbands in the first subband set, and apply a different closed loop power control (CLPC) configuration to each subband in the first subband set; or
apply a different open loop power control (OLPC) configuration to each subband in the first subband set, and apply a same closed loop power control (CLPC) configuration to all subbands in the first subband set; and
send uplink transmissions on the first and second subband sets in accordance with the separate ULPC processes; and
a memory coupled to the at least one processor.

* * * * *